US008199754B2

(12) United States Patent
Smith et al.

(10) Patent No.: US 8,199,754 B2
(45) Date of Patent: Jun. 12, 2012

(54) INTRUSION PREVENTION SYSTEM EDGE CONTROLLER

(75) Inventors: Brian C. Smith, Fort Worth, TX (US); Alexander Sarin, Freehold, NJ (US); Hazem M. Kabbara, Boylston, MA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 528 days.

(21) Appl. No.: 11/443,490

(22) Filed: May 30, 2006

(65) Prior Publication Data
US 2007/0280222 A1    Dec. 6, 2007

(51) Int. Cl.
H04L 12/24    (2006.01)
H04L 12/26    (2006.01)
H04L 12/28    (2006.01)
(52) U.S. Cl. .................... 370/392; 370/389; 370/360
(58) Field of Classification Search .............. 370/360, 370/389, 392
See application file for complete search history.

(56) References Cited

U.S. PATENT DOCUMENTS

| | | | | |
|---|---|---|---|---|
| 5,123,011 | A * | 6/1992 | Hein et al. | 370/380 |
| 5,539,725 | A | 7/1996 | Trubey et al. | 370/13 |
| 6,233,237 | B1 | 5/2001 | Yucebay et al. | 370/384 |
| 6,493,751 | B1 | 12/2002 | Tate et al. | 709/221 |
| 6,523,070 | B1 | 2/2003 | Stapleton et al. | 709/250 |
| 6,529,965 | B1 | 3/2003 | Thomsen et al. | 710/8 |
| 6,578,147 | B1 * | 6/2003 | Shanklin et al. | 726/22 |
| 6,714,553 | B1 * | 3/2004 | Poole et al. | 370/412 |
| 6,779,047 | B1 | 8/2004 | Caddes et al. | 710/15 |
| 6,983,323 | B2 | 1/2006 | Cantrell et al. | 709/225 |
| 7,095,715 | B2 | 8/2006 | Buckman et al. | 370/230 |
| 2002/0009079 | A1 * | 1/2002 | Jungck et al. | 370/389 |
| 2002/0032766 | A1 * | 3/2002 | Xu | 709/223 |
| 2003/0123476 | A1 * | 7/2003 | Shenoi | 370/458 |
| 2005/0117576 | A1 * | 6/2005 | McDysan et al. | 370/389 |
| 2005/0163132 | A1 * | 7/2005 | Mieno et al. | 370/395.53 |
| 2005/0265364 | A1 * | 12/2005 | Gallatin et al. | 370/401 |
| 2006/0023709 | A1 * | 2/2006 | Hall et al. | 370/389 |
| 2006/0171331 | A1 * | 8/2006 | Previdi et al. | 370/254 |

OTHER PUBLICATIONS

Newton, Harry "Newton's Telecom Dictionary" Mar. 2007, Flatiron Publishing, 23rd Edition.*
Newton, Harry "Newton's Telecom Dictionary" 2007, Flatiron Publishing, 23rd Edition.*
Institute of Electrical and Electronics Engineers "Carrier sense multiple access with collision detection (CSMA/CD) access method and physical layer specifications" IEEE 802.3-2005 2005 pp. 53 and 54.*
Institute of Electrical and Electronics Engineers "Carrier sense multiple access with collision detection (CSMA/CD) access method and physical layer specifications" IEEE 802.3-2005 2005 Entire Document.*

* cited by examiner

Primary Examiner — Dang Ton
Assistant Examiner — Robert M Morlan

(57) ABSTRACT

A system and method for extending the implementation of one or more Intrusion Prevention Systems (IPSs) such that each user can be placed in the IPS traffic path to create secure containment areas at a granular level, port types and port counts are increased, and higher network connection speeds are supported. In different embodiments of the invention, traffic load is balanced across two or more IPSs, enabling enhanced availability during system failures, replacements or updates. IPS performance is improved by enhancing traffic management of "trusted" (e.g., pass-through) and "known bad" (e.g., discarded) traffic flows and decreasing configuration task workloads. Other embodiments of the invention include, but are not limited to, extending the implementation of proxy devices, virtual private networks (VPNs), session border controllers (SBCs), firewalls, protocol gateways and other bump-in-the-wire systems.

12 Claims, 11 Drawing Sheets

INTRUSION PREVENTION SYSTEM EDGE CONTROLLER

BACKGROUND OF THE INVENTION

1. Field of the Invention

The present invention relates in general to the field of network security and more specifically, to intrusion prevention systems.

2. Description of the Related Art

The use of networks has grown significantly over the last few years. Concurrently, the sophistication of internal and external network attacks in the form of viruses, Trojan horses, worms and malware of all sorts has increased dramatically. Just as dramatic is the accelerated increase of network speeds and a corresponding drop in their cost, thereby driving their rapid adoption. These factors and others have necessitated the development of innovative and more advanced network security mechanisms.

For example, Intrusion Detection Systems (IDS) can often detect network attacks, but as passive systems they generally offer little more than after-the-fact notification. In contrast, Intrusion Prevention Systems (IPS) have been developed to complement traditional security products such as firewalls by proactively analyzing network traffic flows and active connections while scanning incoming and outgoing requests. As network traffic passes through the IPS, it is examined for malicious packets. If a potential threat is detected or traffic is identified as being associated with an unwanted application it is blocked, yet legitimate traffic is passed through the system unimpeded.

Properly implemented, IPSs can be an effective network security safeguard. However, there is a current need for additional IPS capabilities, such as the ability to protect against attacks from peers sharing a common switch. Other needs include the ability to scale existing IPSs to accommodate higher network link speeds and balance traffic loads across multiple IPSs. Similarly, there is a growing demand for greater numbers of port types and port counts, as well as enhanced availability during system failures, replacements or updates. Likewise, with the growing popularity of applications such as voice over IP (VoIP), there is a need for enhanced traffic management through port segmentation and improved system performance through the use of "trusted" and "known bad" (e.g., discarded) traffic flows. In view of the foregoing, more flexible, scalable and manageable implementations of IPS capabilities are needed.

SUMMARY OF THE INVENTION

In accordance with the present invention, a system and method is disclosed for extending the implementation of one or more Intrusion Prevention Systems (IPSs) through integration with one or more IPS Edge Controllers such that each user can be placed in the IPS traffic path to create secure containment areas at a granular level, port types and port counts are increased, higher network connection speeds are supported, traffic load is balanced across two or more IPSs, enhanced availability is enabled during system failures, replacements or updates, ports are segmented for enhanced traffic management, performance is improved through the use of "trusted" and "known bad" (i.e., discarded) traffic flows, and configuration task workloads are decreased.

Those of skill in the art will be aware that Intrusion Prevention Systems (IPSs) that perform network traffic security processing before data packets are processed by a host computer are generally referred to as "bump in the wire" (BITW) systems. In different embodiments of the present invention, an IPS Edge Controller is implemented with a BITW-based IPS, thereby allowing the IPS to be placed as a "bump in traffic path" (BITP) of each user. The IPS Edge Controller increases the number of IPS port types and port counts, thereby enabling various port speeds and physical media interconnection types. The addition of such switch ports to an IPS allows higher speed (e.g., 10 Gbps Ethernet) network interfaces to be supported by load balancing traffic flows across two or more lower speed (e.g., 1 Gbps) IPSs. Similarly, the implementation of multiple IPSs in conjunction with an IPS Edge Controller can provide increased and enhanced availability during system failures, replacements, or updates. For example, if one IPS is lost or removed from service, the IPS Edge Controller can redistribute the traffic load to one or more other IPSs. If no operational IPS is available due to failure or removal from service, the IPS Edge Controller can pass traffic directly from incoming side 'A' ports to outgoing side 'B' ports.

Additionally, different embodiments of the invention can improve overall system performance through the management of traffic flows. As an example, "trusted" flows can be configured among IPS Edge Controller ports to bypass the IPS, resulting in higher "trusted" flow performance. Likewise, "known bad" flows can be discarded by the IPS Edge Controller ports such that they never reach the IPS, thereby improving IPS performance by freeing resources for improved processing of "unknown" traffic. Similarly, the IPS Edge Controller can be configured to transition into bypass mode when a predetermined IPS packet loss threshold level is reached. In an embodiment of the invention, a configuration agent can be implemented to utilize information from the IPS, the IPS Edge Controller, observed traffic, and/or network management input to automatically and dynamically configure IPS Edge Controller ports, as well as enabling "hitless" updates to the IPS, thereby resulting in decreased configuration work load. Other embodiments of the invention include, but are not limited to, extending the implementation of proxy devices, virtual private networks (VPNs), session border controllers (SBCs), firewalls, protocol gateways, and other bump-in-the-wire systems. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

IPS Edge Controller extends the implementation of one or more Intrusion Prevention Systems (IPSs) such that each user can be placed in the IPS traffic path to create secure containment areas at a granular level, port types and port counts are increased, higher network connection speeds are supported, traffic load is balanced across two or more IPSs, enhanced availability is enabled during system failures, replacements or updates, and performance is improved through the use of "trusted" and "known bad" (i.e., discarded) traffic flows and decreased configuration task workloads.

Figure 1:
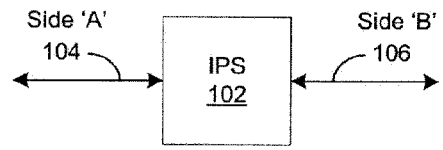
FIG. 1 is a generalized block diagram illustrating an Intrusion Prevention System (IPS) as commonly implemented as a "Bump In The Wire" (BITW)

FIG. 1 is a generalized block diagram illustrating Intrusion Prevention System (IPS) 102 as commonly implemented as a "Bump In The Wire" (BITW). IPS 102 typically comprises one or more ports comprising Side 'A' 104 and one or more ports comprising Side 'B' 106. The ports comprising Side 'A' 104 and Side 'B' 106 are typically implemented to handle bidirectional network traffic. Incoming network traffic packets are examined by IPS 102 for security threats, and if found, the packets are filtered out or discarded instead of being forwarded to their intended destination.

Figure 2:
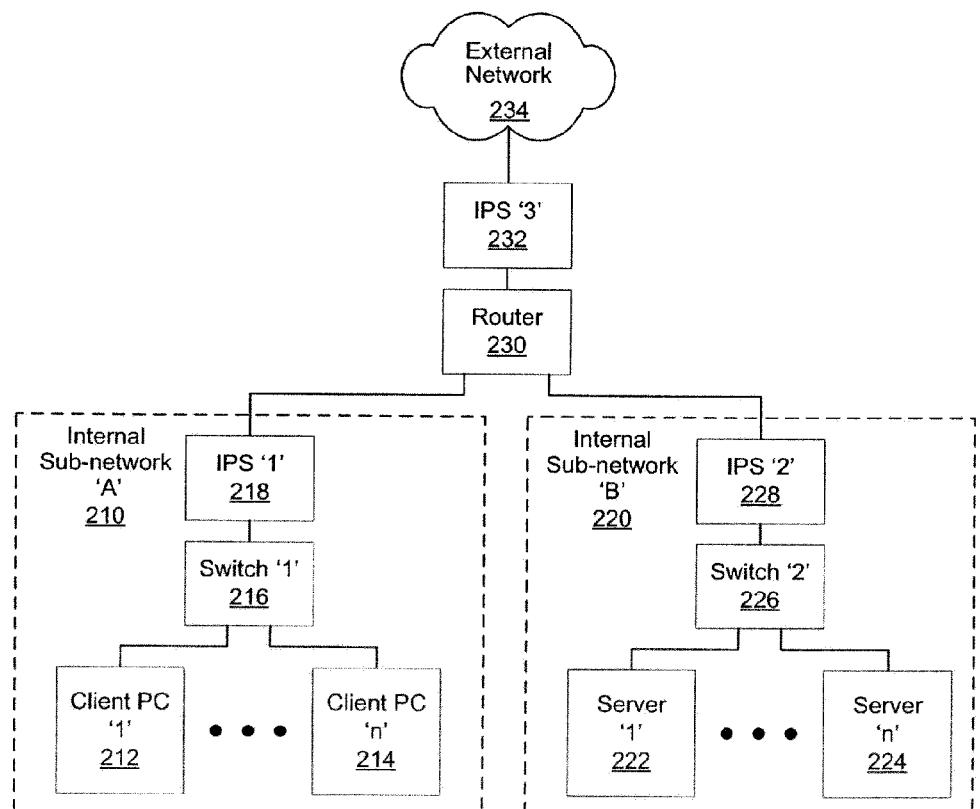
FIG. 2 is a generalized block diagram illustrating a plurality of IPSs as commonly implemented in a network environment.

FIG. 2 is a generalized block diagram illustrating a plurality of Intrusion Prevention Systems (IPSs) 218, 228, 232, as commonly implemented in a network environment. In this illustration, internal sub-network 'A' 210 is comprised of client personal computer (PC) '1' 212 through client PC 'n' 214, connected to switch '1' 216, which in turn is connected to IPS '1' 218. Internal sub-network 'B' 220 is comprised of server '1' 222 through server 'n' 224, connected to switch '2' 226, which in turn is connected to IPS '2' 228. Internal sub-network 'A' 210 and internal sub-network 'B' 220 are connected to router 230, which is connected to IPS '3' 232, which in turn is connected to external network 234. IPS '3' 232 is commonly implemented to prevent the intrusion of security threats into internal sub-network 'A' 210 and internal sub-network 'B' 220 from external network 234.

IPS '1' 218 provides additional intrusion protection by preventing the intrusion of security threats originating from internal sub-network 'A' 210. Likewise, IPS '2' 228 provides additional intrusion protection by preventing the intrusion of security threats originating from internal sub-network 'B' 220. As will be apparent to skilled practitioners of the art, the implementation of IPS '1' 218 isolates intrusion issues to internal sub-network 210, comprised of one or more client PCs 212 through 214 and corresponding switch '1' 216. Similarly, the implementation of IPS '2' 228 isolates intrusion issues to internal sub-network 220, comprised of one or more servers 222 through 224 and corresponding switch '1' 226.

Figure 3:
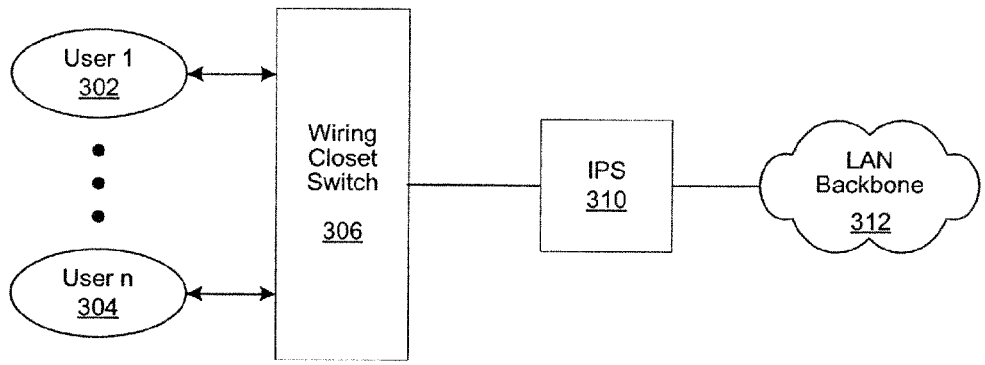
FIG. 3 is a generalized block diagram illustrating an IPS as commonly implemented with a wiring closet switch.

FIG. 3 is a generalized block diagram illustrating Intrusion Prevention System (IPS) 410 as commonly implemented as a "Bump In The Wire" (BITW) with wiring closet switch 306. In this illustration, user '1' 302 through user 'n' 304 are connected to wiring closet switch 306, which is connected to IPS 310, which in turn is connected to local area network (LAN) Backbone 312. As described in greater detail hereinabove, IPS 310 is commonly implemented between a switch and a network to prevent security threats from being received from, or transmitted to, LAN backbone 312. However, while user '1' 302 through user 'n' 304 are protected from receiving and sending security threats through LAN backbone 312, they are not protected from each other, as peer-to-peer traffic can traverse wiring closet switch 306 without being examined by IPS 310 for security threats. The same security issues are equally applicable to implementations of proxy devices, virtual private networks (VPNs), session border controllers (SBCs), firewalls, protocol gateways, and other bump-in-the-wire systems known to those of skill in the art.

Figure 4:
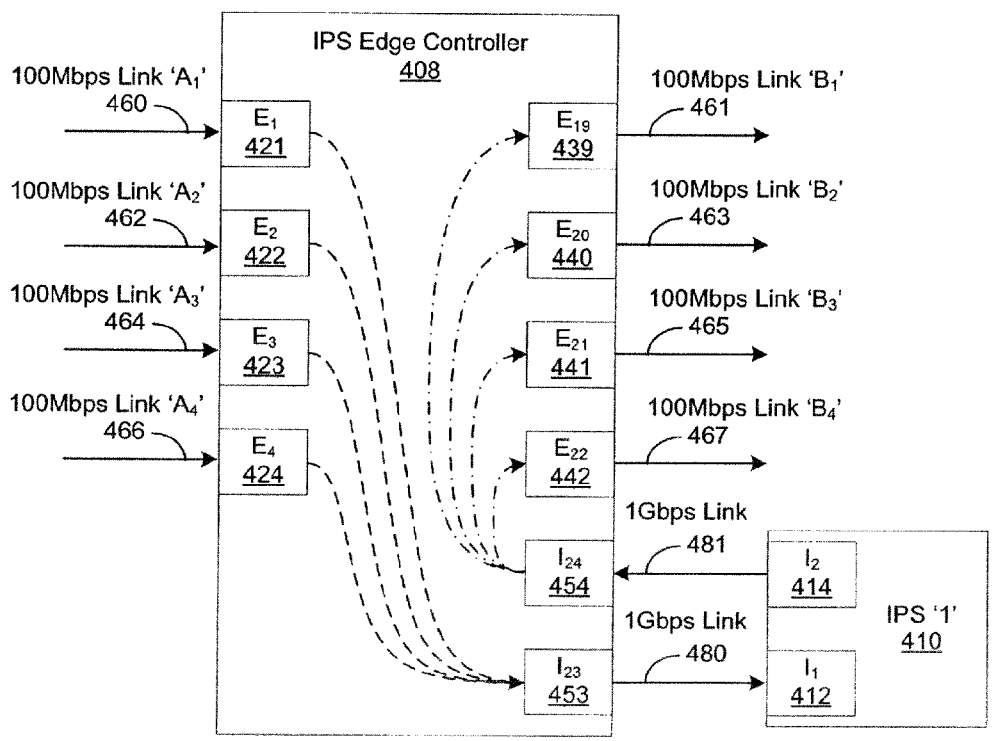
FIG. 4 is a generalized block diagram illustrating an embodiment of the present invention implemented as an IPS Edge Controller to provide additional port pairs for a "Bump In Traffic Path" (BITP)-based IPS.

FIG. 4 is a generalized block diagram illustrating an embodiment of the present invention implemented as IPS Edge Controller 408 to provide additional port pairs for a "Bump In Traffic Path" (BITP) Intrusion Prevention System (IPS). In this embodiment of the invention, IPS Edge Controller 408 comprises a plurality of side 'A' end-point ports (E-ports) $E_1$ 421, $E_2$ 422, $E_3$ 423, $E_4$ 424 and a corresponding plurality of side 'B' E-ports $E_{19}$ 439, $E_{20}$ 440, $E_{21}$ 441, $E_{22}$ 442, which connect to network end-points or other network infrastructures such as, but not limited to, firewalls, routers or switches. IPS Edge Controller 408 likewise comprises IPS ports (I-ports) $I_{23}$ 453 and $I_{24}$ 454, which are connected to corresponding inbound link port $I_1$ 412 and outbound link port $I_2$ 414 of IPS '1' 410. E-ports and I-ports are grouped in pairs, with one E-port of the pair directly connected to side 'A' and indirectly connected to one of the I-ports. The other I-port of the pair is indirectly connected to the other E-port, which is directly connected to side 'B.'

In an embodiment of the invention, as network packets enter IPS Edge Controller 408 on a side 'A' E-port, IPS Edge Controller 408 adds a Virtual Local Area Network (VLAN) tag to each packet to indicate which side 'B' E-port the packet will exit after IPS processing. The packet is then forwarded to the I-port corresponding to the side 'A' E-port, which then conveys the packet to IPS '1' 410 for processing. Once IPS processing is complete, the packet is transmitted from the IPS '1' 410 to the I-port corresponding to the side 'B' E-port indicated in the packet by the VLAN tag.

I-ports are divided into outbound and inbound groups. Outbound I-ports are combined using a link aggregation feature to form an outbound logical I-port (OLIP). Inbound I-ports are typically configured such that Media Access Control (MAC) address learning is disabled and they are made a member of all VLANs. E-ports are configured to redirect traffic to the OLIP. Since the IPS Edge Controller performs the redirect function, all "unknown" (i.e., not identified as "trusted" or "known bad") traffic received on the E-port is directed to the OLIP. Given that the OLIP is a logical port, inbound traffic is load balanced at the flow level between ports.

In an embodiment of the invention, a plurality of incoming 100 Mbps network links $A_1$ 460, $A_2$ 462, $A_3$ 464, $A_4$ 466 are connected to corresponding side 'A' E-ports $E_1$ 421, $E_2$ 422, $E_3$ 423, $E_4$ 424. As packets from each network link enter IPS Edge Controller 408, a VLAN tag is added to each packet to indicate which side 'B' E-port the packet will exit after processing by IPS '1' 410. In this embodiment of the invention, traffic flows from E-ports $E_1$ 421, $E_2$ 422, $E_3$ 423, $E_4$ 424 are combined, or "fanned-in", to I-port $I_{23}$ 453. The combined traffic flows are then conveyed by I-port $I_{23}$ 453 via 1 Gbps network link 480 to inbound IPS link port $I_1$ 412 of IPS '1' 410 for processing. Once IPS processing is complete, the combined traffic flows are conveyed through outbound IPS link port $I_2$ 414 via 1 Gbps network link 481 to I-port $I_{24}$ 454. As the combined traffic flows are received by I-port $I_{24}$ 454, IPS Edge Controller 408 examines the added VLAN tag of each packet to determine its indicated exit E-port, removes the VLAN tag from the packet, and then transmits the resulting packet to indicated side 'B' E-ports $E_{19}$ 439, $E_{20}$ 440, $E_{21}$ 441, $E_{22}$ 442, which are respectively connected to outgoing 100 Mbps network links $B_1$ 461, $B_2$ 463, $B_3$ 465, $B_4$ 467. In this embodiment of the invention, the 1 Gbps bandwidth of network link 480, connecting I-port $I_{23}$ 453 and inbound IPS link port $I_1$ 412 of IPS '1' 410, can accommodate the combined bandwidth of incoming 100 Mbps network links $A_1$ 460, $A_2$ 462, $A_3$ 464, $A_4$ 466, and the 1 Gbps bandwidth of network link 481 connecting IPS outbound link port $I_2$ 414 of IPS '1' 410 and I-port $I_{24}$ 454 can similarly accommodate the combined bandwidth of outgoing 100 Mbps network links $B_1$ 461, $B_2$ 463, $B_3$ 465, $B_4$ 467.

In different embodiments of the invention, the IPS Edge Controller can be used to implement "trusted" traffic flows that bypass IPS inspection for increased performance. For example, voice-over-IP (VoIP) traffic can be designated as "trusted" and not requiring IPS processing, thereby preserving IPS resources for other uses. Trusted traffic flows are implemented by creating access control lists (ACLs) on IPS Edge Controller side 'A' E-ports 421, 422, 423, 424 that allow "trusted" flows to bypass the IPS and be transmitted as normal out of corresponding side 'B' E-ports 439, 440, 441, 442.

In an embodiment of the invention, IPS 410 and IPS Edge Controller 408 are physically separated and directly coupled via cables, such as but not limited to, copper wire or fiberoptic cables. In another embodiment of the invention, IPS 410 and IPS Edge Controller 408 are physically separated and remotely coupled via long cables, such as but not limited to, copper wire or fiberoptic cables.

Figure 5:
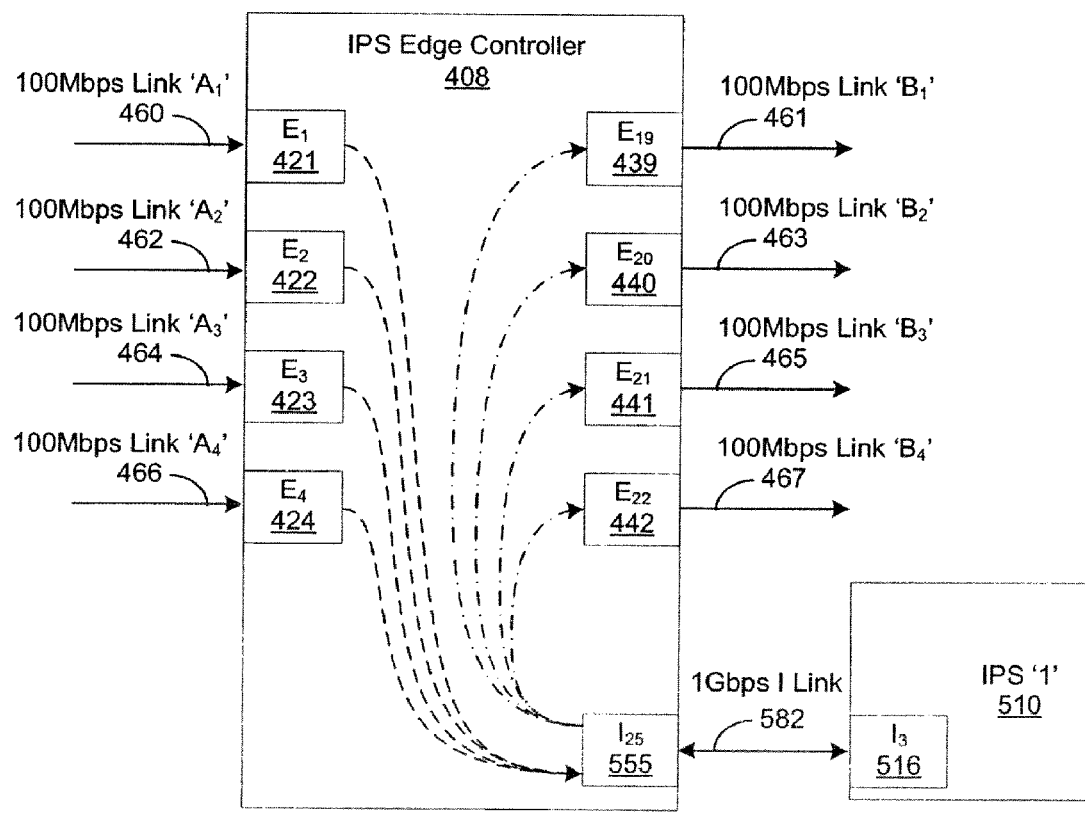
FIG. 5 is a generalized block diagram illustrating an embodiment of the present invention implemented as an IPS Edge Controller providing additional port pairs through a single, bi-directional 'I' link to a BITP-based IPS.

FIG. 5 is a generalized block diagram illustrating an embodiment of the present invention implemented as IPS Edge Controller 408 providing additional port pairs through a single, bi-directional 'I' link 582 to "Bump In Traffic Path" (BITP) Intrusion Prevention System (IPS) 510. In this embodiment of the invention, IPS Edge Controller 408 comprises a plurality of side 'A' end-point ports (E-ports) $E_1$ 421, $E_2$ 422, $E_3$ 423, $E_4$ 424 and a corresponding plurality of side 'B' E-ports $E_{19}$ 439, $E_{20}$ 440, $E_{21}$ 441, $E_{22}$ 442, which connect to network end-points or other network infrastructures such as, but not limited to, firewalls, routers or switches. IPS Edge Controller 408 likewise comprises bi-directional IPS port (I-port) $I_{25}$ 555, which is connected to corresponding bi-directional inbound/outbound link port $I_3$ 516 of IPS '1' 510 by a single cable.

In this embodiment of the invention, E-ports and I-ports are grouped in pairs, with one E-port of the pair directly connected to side 'A,' the other directly connected to side 'B,' and both indirectly connected to bi-directional I-port $I_{25}$ 555. As network packets enter IPS Edge Controller 408 on a side 'A' E-port, IPS Edge Controller 408 adds a Virtual Local Area Network (VLAN) tag to each packet to indicate which side 'B' E-port the packet will exit after IPS processing. The packet is then forwarded to bi-directional I-port $I_{25}$ 555, which then conveys the packet to IPS '1' 510 for processing. Once IPS '1' 510 completes processing of the packet, it is transmitted through bi-directional I-port $I_{25}$ 555 to the side 'B' E-port indicated in the packet by the VLAN tag.

I-ports are divided into outbound and inbound groups. Outbound I-ports are combined using a link aggregation feature to form an outbound logical I-port (OLIP). Inbound I-ports are typically configured such that Media Access Control (MAC) address learning is disabled and they are made a member of all VLANs. E-ports are configured to redirect traffic to the OLIP. Since the IPS Edge Controller performs the redirect function, all "unknown" (i.e., not identified as "trusted" or "known bad") traffic received on the E-port is directed to the OLIP. Given that the OLIP is a logical port, inbound traffic is load balanced at the flow level between ports.

In an embodiment of the invention, a plurality of incoming 100 Mbps network links $A_1$ 460, $A_2$ 462, $A_3$ 464, $A_4$ 466 are connected to corresponding side 'A' E-ports $E_1$ 421, $E_2$ 422, $E_3$ 423, $E_4$ 424. As packets from each network link enter IPS Edge Controller 408, a VLAN tag is added to each packet to indicate which side 'B' E-port the packet will exit after processing by IPS '1' 510. In this embodiment of the invention, traffic flows from E-ports $E_1$ 421, $E_2$ 422, $E_3$ 423, $E_4$ 424 are combined, or "fanned-in," to bi-directional I-port $I_{25}$ 555. The combined traffic flows are then conveyed by bi-directional I-port $I_{25}$ 555 via 1 Gbps network link 582 to bi-directional inbound/outbound IPS link port $I_3$ 516 of IPS '1' 510 for processing. Once IPS processing is complete, the combined traffic flows are conveyed through bi-directional inbound/outbound IPS link port $I_3$ 516 via 1 Gbps network link 582 to bi-directional I-port $I_{25}$ 555. As the combined traffic flows are received by bi-directional I-port $I_{25}$ 555, IPS Edge Controller 408 examines the added VLAN tag of each packet to determine its indicated exit E-port, removes the VLAN tag from the packet, and then transmits the resulting packet to indicated side 'B' E-ports $E_{19}$ 439, $E_{20}$ 440, $E_{21}$ 441, $E_{22}$ 442, which are respectively connected to outgoing 100 Mbps network links $B_1$ 461, $B_2$ 463, $B_3$ 465, $B_4$ 467. In this embodiment of the invention, the 1 Gbps bandwidth of network link 582, connecting bi-directional I-port $I_{25}$ 555 and bi-directional inbound/outbound IPS link port $I_3$ 516 of IPS '1' 510, can accommodate the combined bandwidth of incoming 100 Mbps network links $A_1$ 460, $A_2$ 462, $A_3$ 464, $A_4$ 466, and the combined bandwidth of outgoing 100 Mbps network links $B_1$ 461, $B_2$ 463, $B_3$ 465, $B_4$ 467. In an embodiment of the invention, IPS 510 and IPS Edge Controller 408 are physically separated and directly coupled via cables, such as but not limited to, copper wire or fiberoptic cables. In another embodiment of the invention, IPS 510 and IPS Edge Controller 408 are physically separated and remotely coupled via long cables, such as but not limited to, copper wire or fiberoptic cables.

Figure 6:
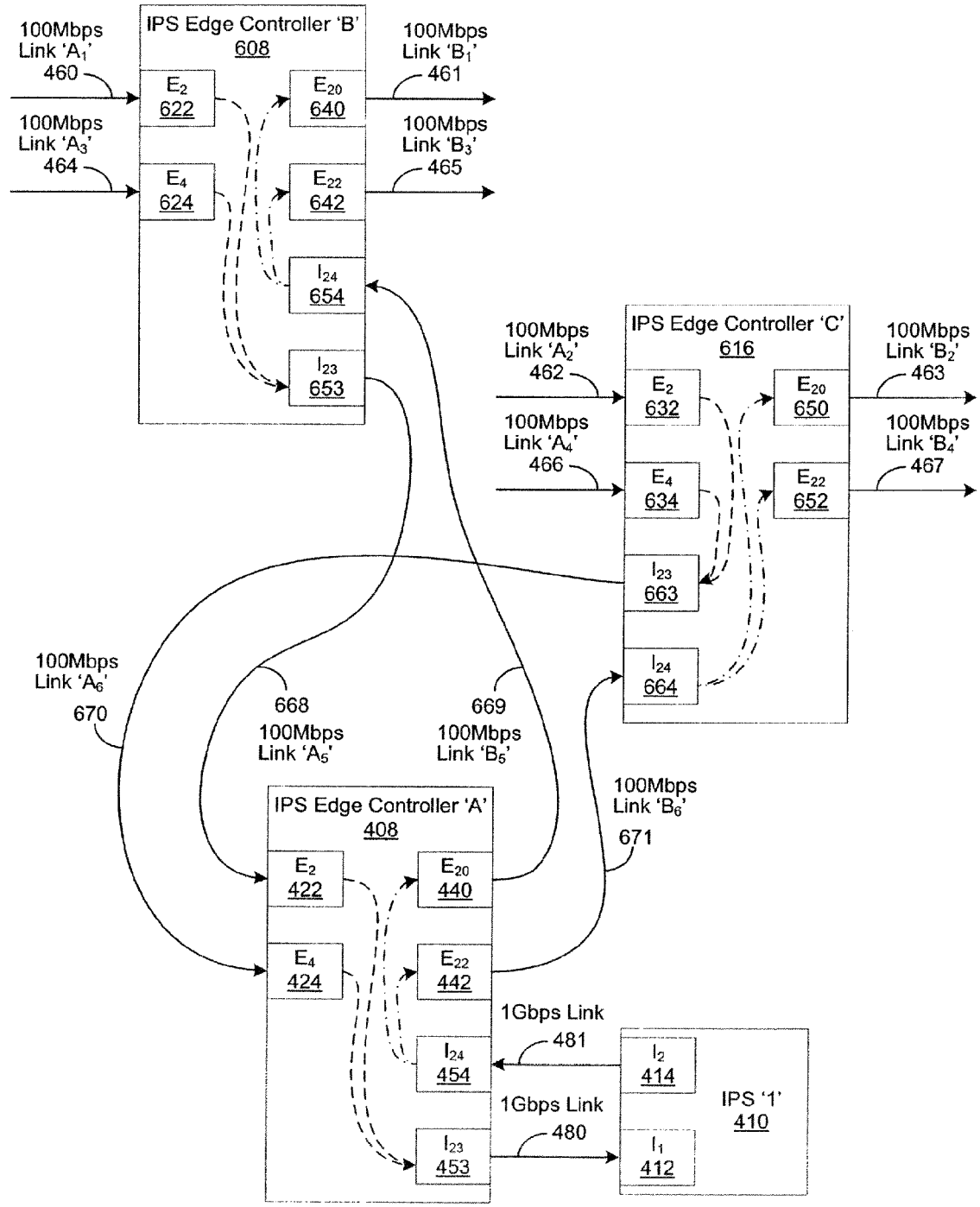
FIG. 6 is a generalized block diagram illustrating an embodiment of the present invention implemented as two or more chained IPS Edge Controllers providing additional port pairs to BITP-based IPS.

FIG. 6 is a generalized block diagram illustrating an embodiment of the present invention implemented as two or more chained IPS Edge Controllers 408, 608, 616 providing additional port pairs to "Bump In Traffic Path" (BITP) Intrusion Prevention System (IPS) 510. In this embodiment of the invention, IPS Edge Controller 'A' 408 comprises a plurality of side 'A' end-point ports (E-ports) $E_2$ 422, $E_4$ 424, connected to I-ports $I_{23}$ 653 and $I_{23}$ 663 of IPS Edge Controller 'B' 608 and IPS Edge Controller 'C' 616 respectively, and a corresponding plurality of side 'B' E-ports $E_{20}$ 440, $E_{22}$ 442, which connect to I-ports $I_{24}$ 654 and $I_{24}$ 664 of IPS Edge Controller 'B' 608 and IPS Edge Controller 'C' 616, respectively. IPS Edge Controller 408 likewise comprises IPS ports (I-ports) $I_{23}$ 453 and $I_{24}$ 454, which are connected to corresponding inbound link port $I_1$ 412 and outbound link port $I_2$ 414 of IPS '1' 410. IPS Edge Controller 'B' 608 comprises a plurality of side 'A' end-point ports (E-ports) $E_2$ 622, $E_4$ 624 and a corresponding plurality of side 'B' E-ports $E_{20}$ 640, $E_{22}$ 642, which connect to network end-points or other network infrastructures such as, but not limited to, firewalls, routers or switches. IPS Edge Controller 608 likewise comprises IPS ports (I-ports) $I_{23}$ 653 and $I_{24}$ 654, which are connected to corresponding E-ports $E_2$ 422, $E_{20}$ 440 of IPS Edge Controller 'A' 408. IPS Edge Controller 'C' 616 comprises a plurality of side 'A' end-point ports (E-ports) $E_2$ 632, $E_4$ 634 and a corresponding plurality of side 'B' E-ports $E_{20}$ 650, $E_{22}$ 652, which connect to network end-points or other network infrastructures such as, but not limited to, firewalls, routers or switches. IPS Edge Controller 616 likewise comprises IPS ports (I-ports) $I_{23}$ 663 and $I_{24}$ 664, which are connected to corresponding E-ports $E_4$ 424, $E_{22}$ 442 of IPS Edge Controller 'A' 408.

As network packets enter IPS Edge Controller 'B' 608 on a side 'A' E-port, IPS Edge Controller 'B' 608 adds a first Virtual Local Area Network (VLAN) tag to each packet to indicate which side 'B' E-port the packet will exit after IPS processing. The packet is then forwarded to the I-port corresponding to the side 'A' E-port, which conveys the packet to a side 'A' E-port on IPS Edge Controller 'A' 408, which adds a second VLAN tag to indicate which side 'B' E-port the packet will exit after IPS processing. The packet is then forwarded to the I-port corresponding to the side 'A' E-port, which then conveys the packet to IPS '1' 410 for processing. Once IPS processing is complete, the packet is transmitted from IPS '1' 410 to the I-port corresponding to the side 'B' E-port of IPS Edge Controller 'A' 408 indicated by the second VLAN tag in the packet, which then forwards the packet to the I-port corresponding to the side 'B' E-port of IPS Edge Controller 'B' 608 as indicated by the first VLAN tag in the packet. Likewise, as network packets enter IPS Edge Controller 'C' 616 on a side 'A' E-port, IPS Edge Controller 'C' 616 adds a first VLAN tag to each packet to indicate which side 'B' E-port the packet will exit after IPS processing. The packet is then forwarded to the I-port corresponding to the side 'A' E-port, which conveys the packet to a side 'A' E-port on IPS Edge Controller 'A' 408, which adds a second VLAN tag to indicate which side 'B' E-port the packet will exit after IPS processing. The packet is then forwarded to the I-port corresponding to the side 'A' E-port, which then conveys the packet to IPS '1' 410 for processing. Once IPS processing is complete, the packet is transmitted from IPS '1' 410 to the I-port corresponding to the side 'B' E-port of IPS Edge Controller 'A' 408 indicated by the second VLAN tag in the packet, which then forwards the packet to the I-port corresponding to the side 'B' E-port of IPS Edge Controller 'C' 616 as indicated by the first VLAN tag in the packet.

In an embodiment of the invention, a plurality of incoming 100 Mbps network links $A_1$ 460, $A_3$ 464 are connected to corresponding side 'A' E-ports $E_2$ 622, $E_4$ 624 of IPS Edge Controller 'B' 608. As packets from each network link enter IPS Edge Controller 'B' 608, a first VLAN tag is added to each packet to indicate which side 'B' E-port the packet will exit after processing by IPS '1' 410. In this embodiment of the invention, traffic flows from E-ports $E_2$ 622, $E_4$ 624 are combined, or "fanned-in," to I-port $I_{23}$ 653 and then conveyed via 100 Mbps link $A_5$ 668 to side 'A' E-port $E_2$ 422 of IPS Edge Controller 'A' 408. Likewise, a plurality of incoming 100 Mbps network links $A_2$ 462, $A_4$ 466 are connected to corresponding side 'A' E-ports $E_2$ 632, $E_4$ 634 of IPS Edge Controller 'C' 616. As packets from each network link enter IPS Edge Controller 'C' 616, a first VLAN tag is added to each packet to indicate which side 'B' E-port the packet will exit after processing by IPS '1' 410. In this embodiment of the invention, traffic flows from E-ports $E_2$ 632, $E_4$ 634 are combined, or "fanned-in," to I-port $I_{23}$ 663 and then conveyed via 100 Mbps link $A_6$ 670 to side 'A' E-port $E_4$ 424 of IPS Edge Controller 'A' 408.

As packets from 100 Mbps links $A_5$ 668 and $A_6$ 670 enter IPS Edge Controller 'A' 408 through 'A' side E-ports $E_2$ 422 and $E_4$ 424 respectively, a second VLAN tag is added to each packet to indicate which side 'B' E-port the packet will exit after processing by IPS '1' 410. In this embodiment of the invention, traffic flows from E-ports $E_2$ 422, $E_4$ 424 are combined, or "fanned-in," to I-port $I_{23}$ 453 and then conveyed via 1 Gbps link 480 to inbound IPS link port $I_1$ 412 of IPS '1' 410 for processing. Once IPS processing is complete, the combined traffic flows are conveyed through outbound IPS link port $I_2$ 414 via 1 Gbps network link 481 to I-port $I_{24}$ 454. As the combined traffic flows are received by I-port $I_{24}$ 454, IPS Edge Controller 408 examines the second VLAN tag of each packet to determine its indicated exit E-port, removes the second VLAN tag from the packet, and then transmits the resulting packet to indicated side 'B' E-ports $E_{20}$ 440, $E_{22}$ 442, which are respectively connected to outgoing 100 Mbps network links $B_5$ 669 and $B_6$ 671. The packets are then forwarded to I-port $I_{24}$ 654 of IPS Edge Controller 'B' 608 or I-port $I_{24}$ 664 of IPS Edge Controller 'C' 616 which remove the first VLAN tag from the packet and then forwards the packet to the corresponding side 'B' E-port $E_{20}$ 640, $E_{22}$ 642 of IPS Edge Controller 'B' 608, respectively connected to outgoing 100 Mbps network links $B_1$ 461, $B_3$ 465, or to the corresponding side 'B' E-port $E_{20}$ 650, $E_{22}$ 652 of IPS Edge Controller 'C' 616, respectively connected to outgoing 100 Mbps network links $B_2$ 463, $B_4$ 467, as indicated by the first VLAN tag in the packet.

In this embodiment of the invention, the 1 Gbps bandwidth of network link 480, connecting I-port $I_{23}$ 453 and inbound IPS link port $I_1$ 412 of IPS '1' 410, can accommodate the combined bandwidth of incoming 100 Mbps network links $A_1$ 460, $A_3$ 464 originating from IPS Edge Controller 'B' 608 and incoming 100 Mbps network links $A_2$ 462, $A_4$ 466 originating from IPS Edge Controller 'C' 616. Likewise, the 1 Gbps bandwidth of network link 481 connecting IPS outbound link port $I_2$ 414 of IPS '1' 410 and I-port $I_{24}$ 454 can similarly accommodate the combined bandwidth of outgoing 100 Mbps network links $B_1$ 461, $B_3$ 465 emanating from IPS Edge Controller 'B' 608 and outgoing 100 Mbps network links $B_2$ 463, $B_4$ 467 emanating from IPS Edge Controller 'C' 616.

In an embodiment of the invention, IPS 410, IPS Edge Controller 'A' 408, IPS Edge Controller 'B' 608, and IPS Edge Controller 'C' 616 are physically separated and directly coupled via cables, such as but not limited to, copper wire or fiberoptic cables. In another embodiment of the invention, IPS 410, IPS Edge Controller 'A' 408, IPS Edge Controller 'B' 608, and IPS Edge Controller 'C' 616 are physically separated and remotely coupled via long cables, such as but not limited to, copper wire or fiberoptic cables. In an embodiment of the invention, one or more IPS Edge Controllers are physically placed between access ports and Layer 2 switches, which in turn are connected to an IPS Edge Controller connected to a Layer 3 switch, allowing further segmentation granularity of IPS-secured containment areas, thereby providing an IPS-protected network area at the access port level.

Figure 7:
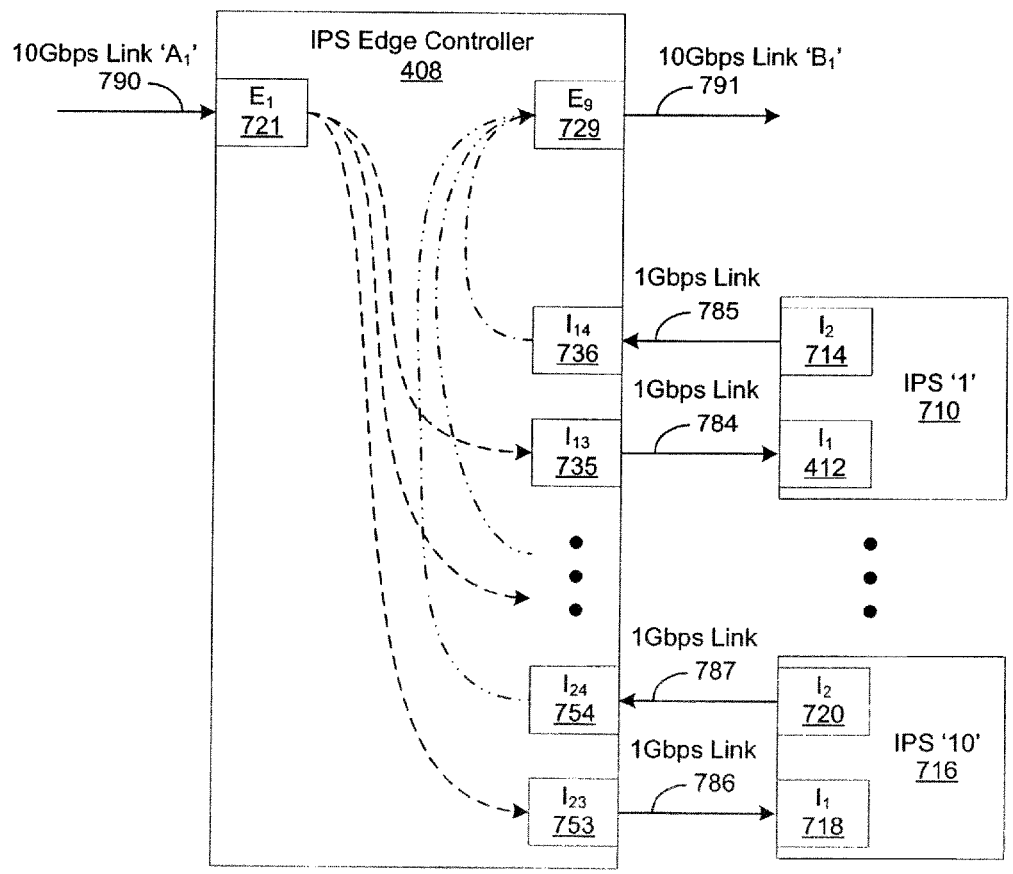
FIG. 7 is a generalized block diagram illustrating an embodiment of the present invention implemented as an IPS Edge Controller to provide load balancing for a BITP-based IPS.

FIG. 7 is a generalized block diagram illustrating an embodiment of the present invention implemented as IPS Edge Controller 408 to provide load balancing for a "Bump In Traffic Path" (BITP) Intrusion Prevention System (IPS). In this embodiment of the invention, IPS Edge Controller 408 comprises side 'A' E-port $E_1$ 721 and side 'B' E-port $E_{19}$ 729, which connect to network end-points or other network infrastructures as described in greater detail hereinabove. IPS Edge Controller 408 similarly comprises I-port pairs $I_{13}$ 735, $I_{14}$ 736 through $I_{23}$ 753, $I_{24}$ 754, which are connected to corresponding IPS link ports $I_1$ 712, $I_2$ 714 of IPS '1' 710 through IPS link ports $I_1$ 718, $I_2$ 720 of IPS '10' 716.

In this embodiment of the invention, E-port $E_1$ 721 is directly connected to side 'A' and indirectly connected to I-ports $I_{13}$ 735 through $I_{23}$ 753, and similarly, I-ports $I_{14}$ 736 through $I_{24}$ 754 are indirectly connected to E-port $E_9$ 729, which is directly connected to side 'B.' As network packets from 1 OGbps network link '$A_1$' 790 enter IPS Edge Controller 408 through side 'A' E-port $E_1$ 721, IPS Edge Controller 408 spreads the network traffic flow across IPS '1' 710 through IPS '10' 716 to balance the traffic load. Each packet is forwarded by IPS Edge Controller 408 to assigned I-ports $I_{13}$ 735 through $I_{23}$ 753, which then convey packets respectively via 1 Gbps links 784 through 786 to corresponding inbound IPS link ports $I_1$ 712 of IPS '1' 710 through $I_1$ 718 of IPS '10' 716.

Once IPS processing is complete, each packet is transmitted from IPS '1' 710 through IPS '10' 716 via corresponding IPS port links $I_2$ 714 through $I_2$ 720 via their respective 1 Gbps network links 785 through 787 to corresponding I-ports $I_{14}$ 736 through $I_{24}$ 754. As IPS-processed packets arrive at I-ports $I_{14}$ 736 through $I_{24}$ 754, IPS Edge Controller 408 aggregates the processed packets into a combined traffic stream that is then conveyed to side 'B' E-port $E_9$ 729, which is connected to 10 Gbps network link '$B_1$' 791.

In this embodiment of the invention, the 1 Gbps bandwidth of network links 784 through 786, connecting I-ports $I_{13}$ 735 through $I_{23}$ 753 and inbound IPS link ports $I_1$ 712 through $I_1$ 718 of IPS '1' 710 and IPS '10' 716 respectively, when combined, can accommodate the bandwidth of incoming 10 Gbps network link $A_1$ 790 connected to E-port $E_1$ 721, and the 1 Gbps bandwidth of network links 785 through 787, connecting I-ports $I_{14}$ 736 through $I_{24}$ 754 and outbound IPS link ports $I_2$ 714 through $I_2$ 720 of IPS '1' 710 through IPS '10' 716 respectively, when combined, can similarly accommodate the bandwidth of outgoing 10 Gbps network link $B_1$ 791 connected to E-port $E_9$ 729. In an embodiment of the invention, IPS '1' 710 through IPS '10' 716 and IPS Edge Controller 408 are physically separated and directly coupled via cables, such as but not limited to, copper wire or fiberoptic cables. In another embodiment of the invention, IPS '1' 710 through IPS '10' 716 and IPS Edge Controller 408 are physically separated and remotely coupled via long cables, such as but not limited to, copper wire or fiberoptic cables.

Figure 8:
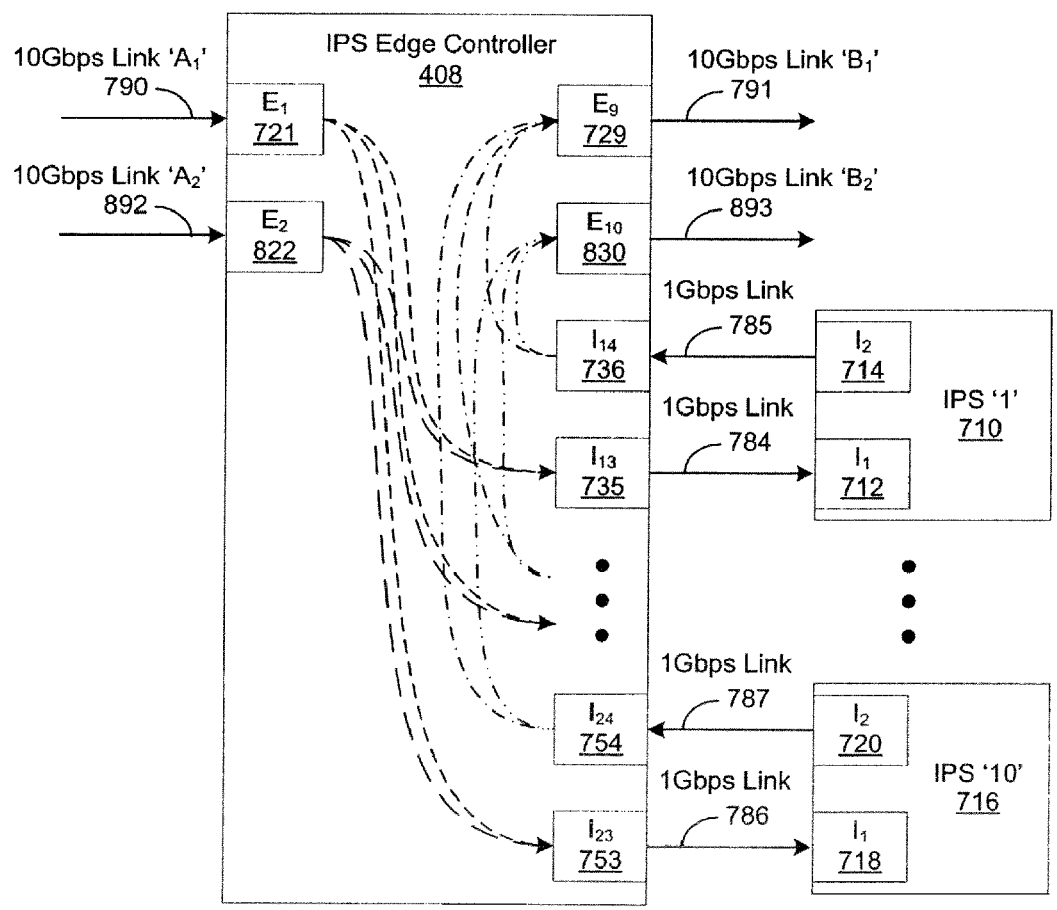
FIG. 8 is a generalized block diagram illustrating an embodiment of the present invention implemented as an IPS Edge Controller to provide high availability for a BITP-based IPS.

FIG. 8 is a generalized block diagram illustrating an embodiment of the present invention implemented as IPS Edge Controller 408 to provide high availability for a "Bump In Traffic Path" (BITP) Intrusion Prevention System (IPS). In this embodiment of the invention, IPS Edge Controller 408 comprises side 'A' E-ports $E_1$ 721, $E_2$ 822, and side 'B' E-ports $E_9$ 729, $E_{10}$ 830, which connect to network end-points or other network infrastructures as described in greater detail hereinabove. IPS Edge Controller 408 similarly comprises I-port pairs $I_{13}$ 735, $I_{14}$ 736 through $I_{23}$ 753, $I_{24}$ 754, which are connected to corresponding IPS link ports $I_1$ 712, $I_2$ 714 of IPS '1' 710 through IPS link ports $I_1$ 718, $I_2$ 720 of IPS '10' 716.

In this embodiment of the invention, E-ports $E_1$ 721 and $E_2$ 822 are directly connected to side 'A' and indirectly connected to I-ports $I_{13}$ 735 through $I_{23}$ 753, and similarly, I-ports $I_{14}$ 736 through $I_{24}$ 754 are indirectly connected to E-ports $E_9$ 729 and $E_{10}$ 830, which are directly connected to side 'B.' As network packets from 10 Gbps network links '$A_1$' 790, '$A_2$' 892 enter IPS Edge Controller 408 through side 'A' E-ports $E_1$ 721, $E_2$ 822, IPS Edge Controller 408 adds a VLAN tag to each packet to indicate which side 'B' E-port the packet will exit after IPS processing. IPS Edge Controller 408 then spreads the network traffic flows from E-ports $E_1$ 721, $E_2$ 822 across IPS '1' 710 through IPS '10' 716 to balance the traffic. Each packet is forwarded by IPS Edge Controller 408 to assigned I-ports $I_{13}$ 735 through $I_{23}$ 753, which then conveys packets respectively via 1 Gbps links 784 through 786 to corresponding inbound IPS link ports $I_1$ 712 of IPS '1' 710 through $I_1$ 718 of IPS '10' 716.

Once IPS processing is complete, each packet is transmitted from of IPS '1' 710 through IPS '10' 716 via corresponding IPS port links $I_2$ 714 through $I_2$ 720 via their respective 1 Gbps network links 785 through 787 to corresponding I-ports $I_{14}$ 736 through $I_{24}$ 754. As IPS-processed packets arrive at I-ports $I_{14}$ 736 through $I_{24}$ 754, IPS Edge Controller 408 examines the added VLAN tag of each packet to determine its indicated exit E-port, removes the VLAN tag from the packet, and then conveys the resulting packet to indicated side 'B' E-ports $E_9$ 729, $E_{10}$ 830, which are respectively connected to outgoing 10 Gbps network links $B_1$ 791, $B_2$ 893.

In this embodiment of the invention, 10 Gbps network links '$A_1$' 790, '$A_2$' 892 are typically implemented for redundancy and/or high availability and as such are not generally operated at their full capacity. Accordingly, the combined 1 Gbps bandwidth of network links 784 through 786, connecting I-ports $I_{13}$ 735 through $I_{23}$ 753 and inbound IPS link ports $I_1$ 712 through $I_1$ 718 of IPS '1' 710 through IPS '10' 716 respectively, can typically accommodate the combined bandwidth of incoming, non-full-capacity 10 Gbps network links '$A_1$' 790, '$A_2$' 892, respectively connected to E-ports $E_1$ 721 and $E_2$ 822, and similarly, the combined 1 Gbps bandwidth of network links 785 through 787, connecting I-ports $I_{14}$ 736 through $I_{24}$ 754 and outbound IPS link ports $I_2$ 714 through $I_2$ 720 of IPS '1' 710 through IPS '10' 716 respectively, can typically accommodate the combined bandwidth of outgoing 10 Gbps network links '$B1$' 791, '$B_2$' 893, respectively connected to E-ports $E_9$ 729 and $E_{10}$ 830. Should one or more IPS '1' 710 through IPS '10' 716 be removed from service, the remaining IPSs are therefore capable of sustaining processing operations for the combined traffic flows of incoming 10 Gbps network links '$A_1$' 790, '$A_2$' 892 and outgoing 10 Gbps network links '$B1$' 791, '$B_2$' 893. Similarly, should either incoming 10 Gbps network links '$A_1$' 790, '$A_2$' 892 fail or be removed from service, the remaining 10 Gbps network link would typically operate at full capacity, with the resulting network traffic load being distributed across IPS '1' 710 through IPS '10' 716 as described in greater detail hereinabove, thereby providing high availability and continuity of IPS protection. In an embodiment of the invention, IPS '1' 710 through IPS '10' 716 and IPS Edge Controller 408 are physically separated and directly coupled via cables, such as but not limited to, copper wire or fiberoptic cables. In another embodiment of the invention, IPS '1' 710 through IPS '10' 716 and IPS Edge Controller 408 are physically separated and remotely coupled via long cables, such as but not limited to, copper wire or fiberoptic cables.

Figure 9:
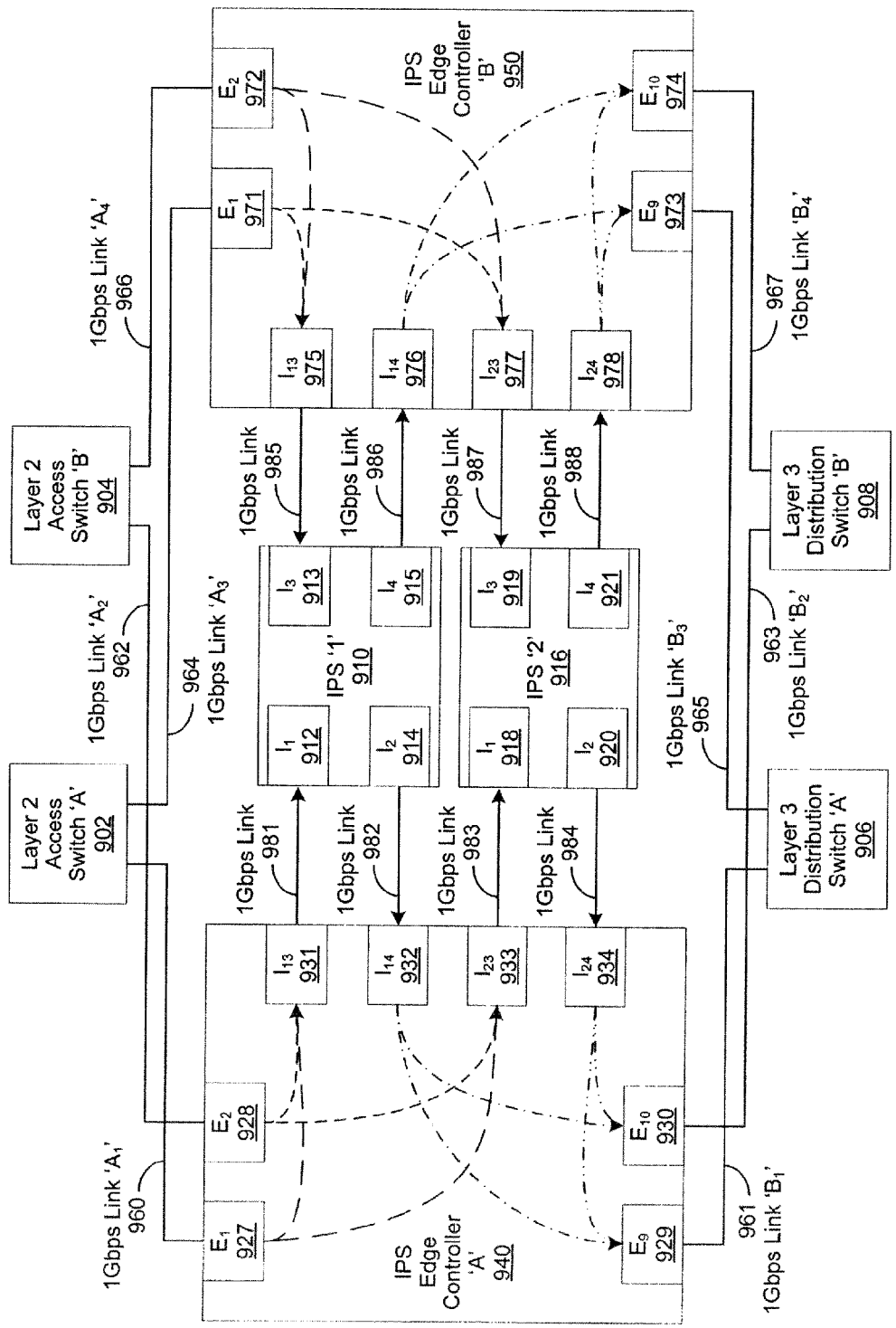
FIG. 9 is a generalized block diagram illustrating an embodiment of the present invention implemented as IPS Edge Controller to provide redundant availability for a BITP-based IPS.

FIG. 9 is a generalized block diagram illustrating an embodiment of the present invention implemented as IPS Edge Controllers 'A' 940 and 'B' 950 to provide redundant availability for a "Bump In Traffic Path" (BITP) Intrusion Prevention System (IPS). In this embodiment of the invention, IPS Edge Controller 'A' 940 comprises side 'A' E-ports $E_1$ 927, $E_2$ 928, which connect to Layer 2 access switches 'A' 902, 'B' 904, via 1 Gbps network links '$A_1$' 960, '$A_2$' 962 respectively, and side 'B' E-ports $E_9$ 929, $E_{10}$ 930, which connect to Layer 3 distribution switches 'A' 906, 'B' 908, via 1 Gbps network links '$B_1$' 961, '$B_2$' 963 respectively. IPS Edge Controller 'A' 908 similarly comprises I-port pairs $I_{13}$ 931, $I_{14}$ 932 and $I_{23}$ 933, $I_{24}$ 934, which are connected to corresponding IPS link ports $I_1$ 912, $I_2$ 914 of IPS '1' 950 and IPS link ports $I_1$ 918, $I_2$ 920 of IPS '2' 916. IPS Edge Controller 'B' 950 similarly comprises side 'A' E-ports $E_1$ 971, $E_2$ 972, which connect to Layer 2 access switches 'A' 902, 'B' 904, via 1 Gbps network links '$A_3$' 964, '$A_4$' 966 respectively, and side 'B' E-ports $E_9$ 973, $E_{10}$ 974, which connect to Layer 3 distribution switches 'A' 906, 'B' 908, via 1 Gbps network links '$B_3$' 965, '$B_4$' 967 respectively. IPS Edge Controller 908 similarly comprises I-port pairs $I_{13}$ 975, $I_{14}$ 976 and $I_{23}$ 977, $I_{24}$ 978, which are connected to corresponding IPS link ports $I_3$ 913, $I_4$ 915 of IPS '1' 910 and IPS link ports $I_3$ 919, $I_4$ 921 of IPS '2' 916. Note that in this embodiment of the invention, IPS '1' 910 and IPS '2' 916 each comprise four IPS link ports, allowing redundant connections to IPS Edge Controllers 'A' 908 and 'B' 950.

In this embodiment of the invention, E-ports $E_1$ 927 and $E_2$ 928 of IPS Edge Controller 'A' 908 are directly connected to side 'A' and indirectly connected to I-ports $I_{13}$ 931, $I_{23}$ 933, and similarly, I-ports $I_{14}$ 932, $I_{24}$ 934 are indirectly connected to E-ports $E_9$ 929 and $E_{10}$ 930, which are directly connected to side 'B.' As network packets from 1 Gbps network links '$A_1$' 960, '$A_2$' 962 enter IPS Edge Controller 'A' 908 through side 'A' E-ports $E_1$ 927, $E_2$ 928, IPS Edge Controller 'A' 908 adds a VLAN tag to each packet to indicate which side 'B' E-port the packet will exit after IPS processing. IPS Edge Controller 'A' 908 then spreads the network traffic flows from E-ports $E_1$ 927, $E_2$ 928 across IPS '1' 910 and IPS '2' 916 to balance the traffic. Each packet is forwarded by IPS Edge Controller 'A' 908 to assigned I-ports $I_{13}$ 931, $I_{23}$ 933, which then convey packets respectively via 1 Gbps links 981, 983 to corresponding inbound IPS link ports $I_1$ 912 of IPS '1' 910 and $I_1$ 918 of IPS '2' 916.

Once IPS processing is complete, each packet is transmitted from IPS '1' 910 and IPS '2' 916 via corresponding IPS port links $I_2$ 914, $I_2$ 920 via their respective 1 Gbps network links 982, 984 to corresponding I-ports $I_{14}$ 932, $I_{24}$ 934. As IPS-processed packets arrive at I-ports $I_{14}$ 932, $I_{24}$ 934, IPS Edge Controller 'A' 908 examines the added VLAN tag of each packet to determine its indicated exit E-port, removes the VLAN tag from the packet, and then conveys the resulting packet to indicated side 'B' E-ports $E_9$ 929, $E_{10}$ 930, which are respectively connected to outgoing 1 Gbps network links $B_1$ 961, $B_2$ 963.

Similarly, E-ports $E_1$ 971 and $E_2$ 972 of IPS Edge Controller 'B' 950 are directly connected to side 'A' and indirectly connected to I-ports $I_{13}$ 975, $I_{23}$ 977, and similarly, I-ports $I_{14}$ 976, $I_{24}$ 978 are indirectly connected to E-ports $E_9$ 973 and $E_{10}$ 974, which are directly connected to side 'B.' As network packets from 1 Gbps network links '$A_3$' 964, '$A_4$' 966 enter IPS Edge Controller 'B' 950 through side 'A' E-ports $E_1$ 971, $E_2$ 972, IPS Edge Controller 'B' 950 adds a VLAN tag to each packet to indicate which side 'B' E-port the packet will exit after IPS processing. IPS Edge Controller 'B' 950 then spreads the network traffic flows from E-ports $E_1$ 971, $E_2$ 972 across IPS '1' 910 and IPS '2' 916 to balance the traffic. Each packet is forwarded by IPS Edge Controller 'B' 950 to assigned I-ports $I_{13}$ 757, $I_{23}$ 977, which then convey packets respectively via 1 Gbps links 985, 987 to corresponding inbound IPS link ports $I_3$ 913 of IPS '1' 910 and $I_3$ 919 of IPS '2' 916.

Once IPS processing is complete, each packet is transmitted from IPS '1' 910 and IPS '2' 916 via corresponding IPS port links $I_4$ 915, $I_4$ 921 via their respective 1 Gbps network links 986, 988 to corresponding I-ports $I_{14}$ 976, $I_{24}$ 978. As IPS-processed packets arrive at I-ports $I_{14}$ 976, $I_{24}$ 978, IPS Edge Controller 'B' 950 examines the added VLAN tag of each packet to determine its indicated exit E-port, removes the VLAN tag from the packet, and then conveys the resulting packet to indicated side 'B' E-ports $E_9$ 973, $E_{10}$ 974, which are respectively connected to outgoing 1 Gbps network links $B_3$ 965, $B_4$ 967.

In this embodiment of the invention, 1 Gbps network links '$A_1$' 960, '$A_2$' 962, $A_3$' 964, '$A_4$' 966, $B_1$' 961, '$B_2$' 963, $B_3$' 965, '$B_4$' 967 are typically implemented for redundancy and/or high availability and as such are not generally operated at their full capacity. Accordingly, the combined bandwidth of 1 Gbps network links 981, 983, connecting I-ports $I_{13}$ 931, $I_{23}$ 933 and IPS link ports $I_1$ 912, $I_1$ 918 of IPS '1' 910 and IPS '2' 916 respectively, can typically accommodate the combined bandwidth of incoming, non-full-capacity 1 Gbps network links '$A_1$' 960, '$A_2$' 962, respectively connected to E-ports $E_1$ 927 and $E_2$ 928, and similarly, the combined 1 Gbps bandwidth of network links 982, 986, connecting I-ports $I_{14}$ 932, $I_{24}$ 934 and outbound IPS link ports $I_2$ 914, $I_2$ 920 of IPS '1' 910 and IPS '2' 916 respectively, can typically accommodate the combined bandwidth of outgoing 1 Gbps network links 'B1' 961, '$B_2$' 963, respectively connected to E-ports $E_9$ 929 and $E_{10}$ 930. Should IPS '1' 910 or IPS '2' 916 be removed from service, the remaining IPS is therefore capable of sustaining processing operations for the combined traffic flows of incoming 1 Gbps network links '$A_1$' 960, '$A_2$' 962 and outgoing 1 Gbps network links '$B_1$' 961, '$B_2$' 963. Similarly, should either incoming 1 Gbps network links '$A_1$' 960, '$A_2$' 961 fail or be removed from service, the remaining 1 Gbps network link would typically operate at full capacity, with the resulting network traffic load being distributed across IPS '1' 910 and IPS '2' 916 as described in greater detail hereinabove, thereby providing high availability and continuity of IPS protection. Similarly, the combined 1 Gbps bandwidth of network links 985, 987, connecting I-ports $I_{13}$ 975, $I_{23}$ 977 and inbound IPS link ports $I_3$ 913, $I_3$ 919 of IPS '1' 910 and IPS '2' 916 respectively, can typically accommodate the combined bandwidth of incoming, non-full-capacity 1 Gbps network links '$A_3$' 964, '$A_4$' 966, respectively connected to E-ports $E_1$ 971 and $E_2$ 972, and similarly, the combined bandwidth of 1 Gbps network links 986, 988, connecting I-ports $I_{14}$ 976, $I_{24}$ 978 and outbound IPS link ports $I_4$ 915, $I_4$ 921 of IPS '1' 910 and IPS '2' 916 respectively, can typically accommodate the combined bandwidth of outgoing 1 Gbps network links '$B_3$' 965, '$B_4$' 967, respectively connected to E-ports $E_9$ 973 and $E_{10}$ 974. Should IPS '1' 910 or IPS '2' 916 be removed from service, the remaining IPS is therefore capable of sustaining processing operations for the combined traffic flows of incoming 1 Gbps network links '$A_3$' 964, '$A_4$' 966 and outgoing 1 Gbps network links '$B_3$' 965, '$B_4$' 967. Similarly, should either incoming 1 Gbps network links '$A_3$' 964, 'A₄' 966 fail or be removed from service, the remaining 1 Gbps network link would typically operate at full capacity, with the resulting network traffic load being distributed across IPS '1' 910 and IPS '10' 916 as described in greater detail hereinabove, thereby providing high availability and continuity of IPS protection.

Furthermore, in different embodiments of the invention, should IPS Edge Controller 'A' 908 or 'B' 950 fail or be removed from service, the remaining IPS Edge Controller can sustain operations, dependent upon combined network traffic loads, by forwarding traffic flows to IPS '1' 910 and IPS '2' 916 as described in more detail hereinabove.

In an embodiment of the invention, IPS '1' 910, IPS '2' 916, IPS Edge Controller 'A' 908, and IPS Edge Controller 'B' 950 are physically separated and directly coupled via cables, such as but not limited to, copper wire or fiberoptic cables. In another embodiment of the invention, IPS '1' 910, IPS '2' 916, IPS Edge Controller 'A' 908, and IPS Edge Controller 'B' 950 are physically separated and remotely coupled via long cables, such as but not limited to, copper wire or fiberoptic cables.

Figure 10:
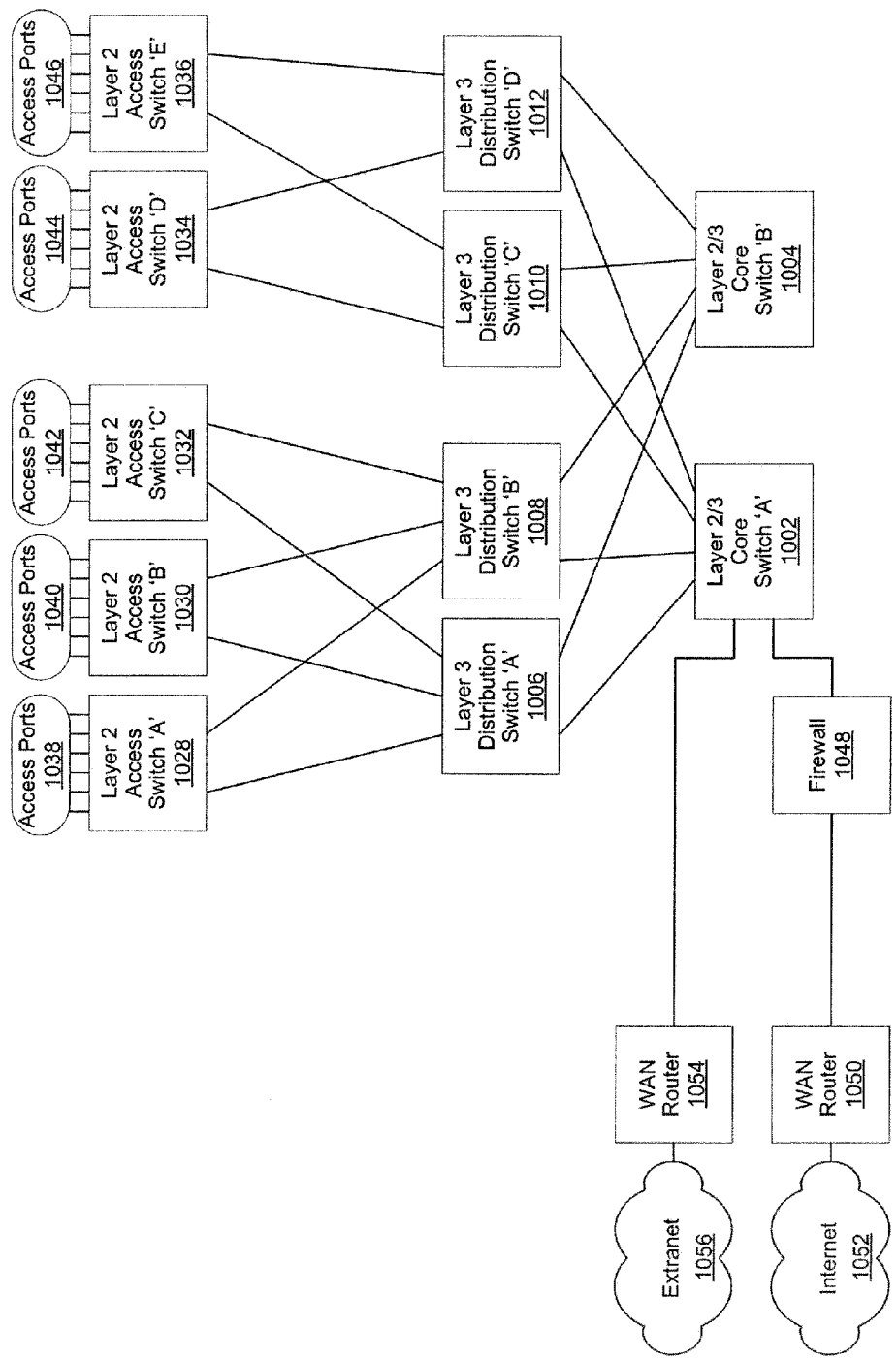
FIG. 10 is a generalized illustration of a network environment comprising redundantly connected Layer 2/3 switches as commonly implemented.

FIG. 10 is a generalized illustration of a network environment comprising redundantly connected Layer 2/3 switches as commonly implemented. In this illustration, Layer 3 distribution switches 'A' 1006, 'B' 1008, 'C' 1010, 'D' 1012 are redundantly connected to Layer 2/3 core switches 'A' 1002 and 'B' 1004. Layer 2 access switches 'A' 1028, 'B' 1030, 'C' 1032 respectively provide access ports 1038, 1040, 1042, and are redundantly connected to Layer 3 distribution switches 'A' 1006 and 'B' 1008. Layer 2 access switches 'D' 1034, 'E' 1036 respectively provide access ports 1044, 1046, and are redundantly connected to Layer 3 distribution switches 'C' 1010 and 'D' 1012.

Protected connectivity to Extranet 1056 is provided through Wide Area Network (WAN) router 1054, which precedes and is connected to Layer 2/3 core switch 'A' 1002. Protected connectivity to the Internet 1052 is similarly provided through WAN router 1050, which precedes and is connected to firewall 1048, which likewise precedes and is connected to Layer 2/3 core switch 'A' 1002. Note that in this illustration, the network receives limited protection from firewalls 1048, 1052 and that no other intrusion detection or prevention systems are implemented.

Figure 11:
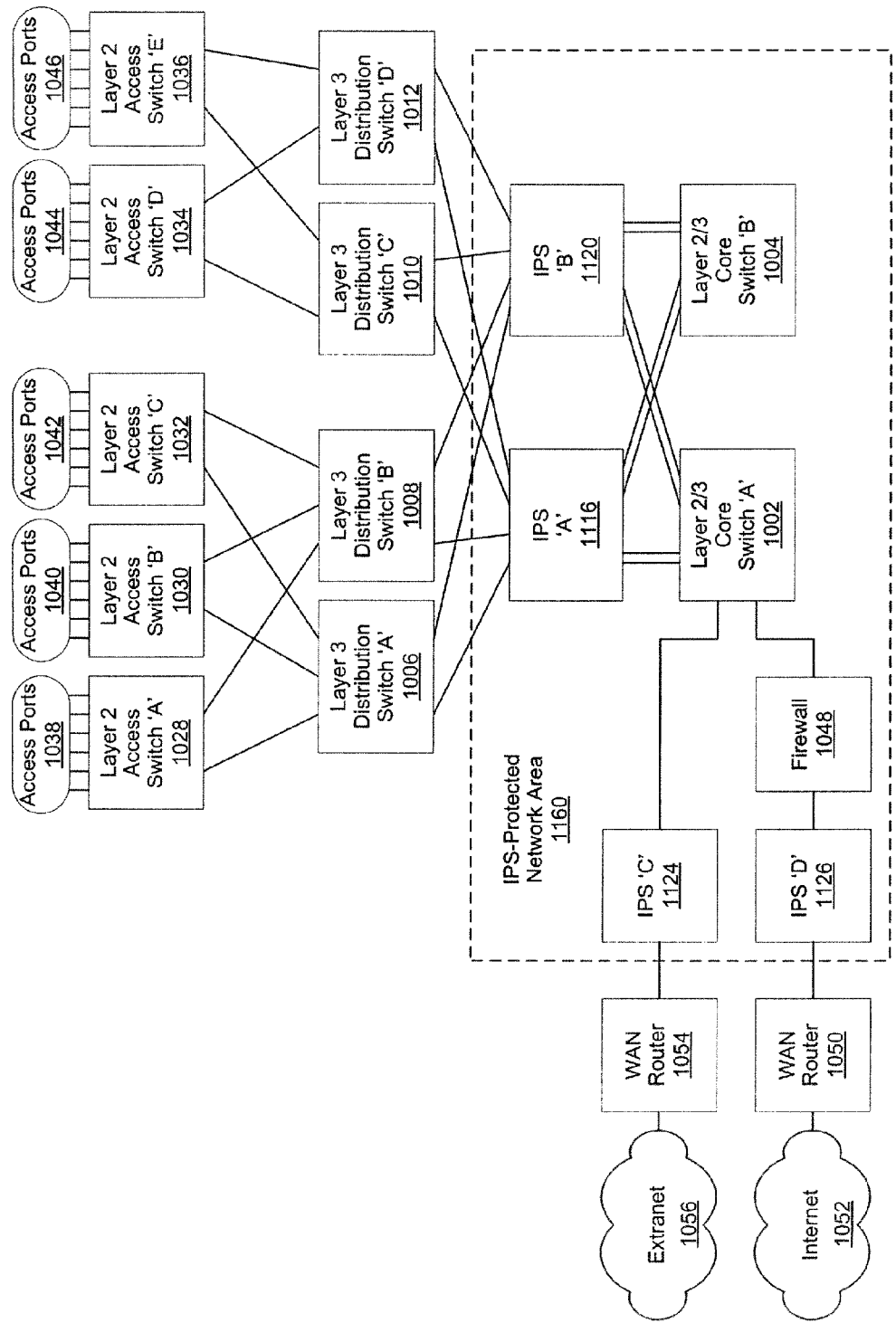
FIG. 11 is a generalized illustration of a network environment comprising redundantly connected Layer 2/3 switches as commonly implemented with a BITW-based IPS.

FIG. 11 is a generalized illustration of a network environment comprising redundantly connected Layer 2/3 switches as commonly implemented with a "Bump In The Wire" (BITW) Intrusion Prevention System (IPS). In this illustration, Layer 3 distribution switches 'A' 1006, 'B' 1008, 'C' 1010, 'D' 1012 are redundantly connected to IPS 'A' 1116 and IPS 'B' 1120, which in turn are redundantly connected to Layer 2/3 core switches 'A' 1002 and 'B' 1004. Layer 2 access switches 'A' 1028, 'B' 1030, 'C' 1032 respectively provide access ports 1038, 1040, 1042, and are redundantly connected to Layer 3 distribution switches 'A' 1006 and 'B' 1008. Layer 2 access switches 'D' 1034, 'E' 1036 respectively provide access ports 1044, 1046, and are redundantly connected to Layer 3 distribution switches 'C' 1010 and 'D' 1012.

Protected connectivity to Extranet 1056 is provided through WAN router 1054, which precedes and is connected to IPS 'C' 1124, which in turn precedes and is connected to Layer 2/3 core switch 'A' 1002. Protected connectivity to the Internet 1052 is similarly provided through WAN router 1050, which precedes and is connected to IPS 'D' 1126, which precedes and is connected to firewall 1048, which likewise precedes and is connected to Layer 2/3 core switch 'A' 1002. In this illustration, IPS-protected network area 1160 does not include Layer 3 distribution switches 'A' 1006, 'B' 1008, 'C' 1010, 'D' 1012, Layer 2 access switches 'A' 1028, 'B' 1030, 'C' 1032, 'D' 1034 'E' 1036, or their respective access ports 1038, 1040, 1042, 1044, 1046.

Figure 12:
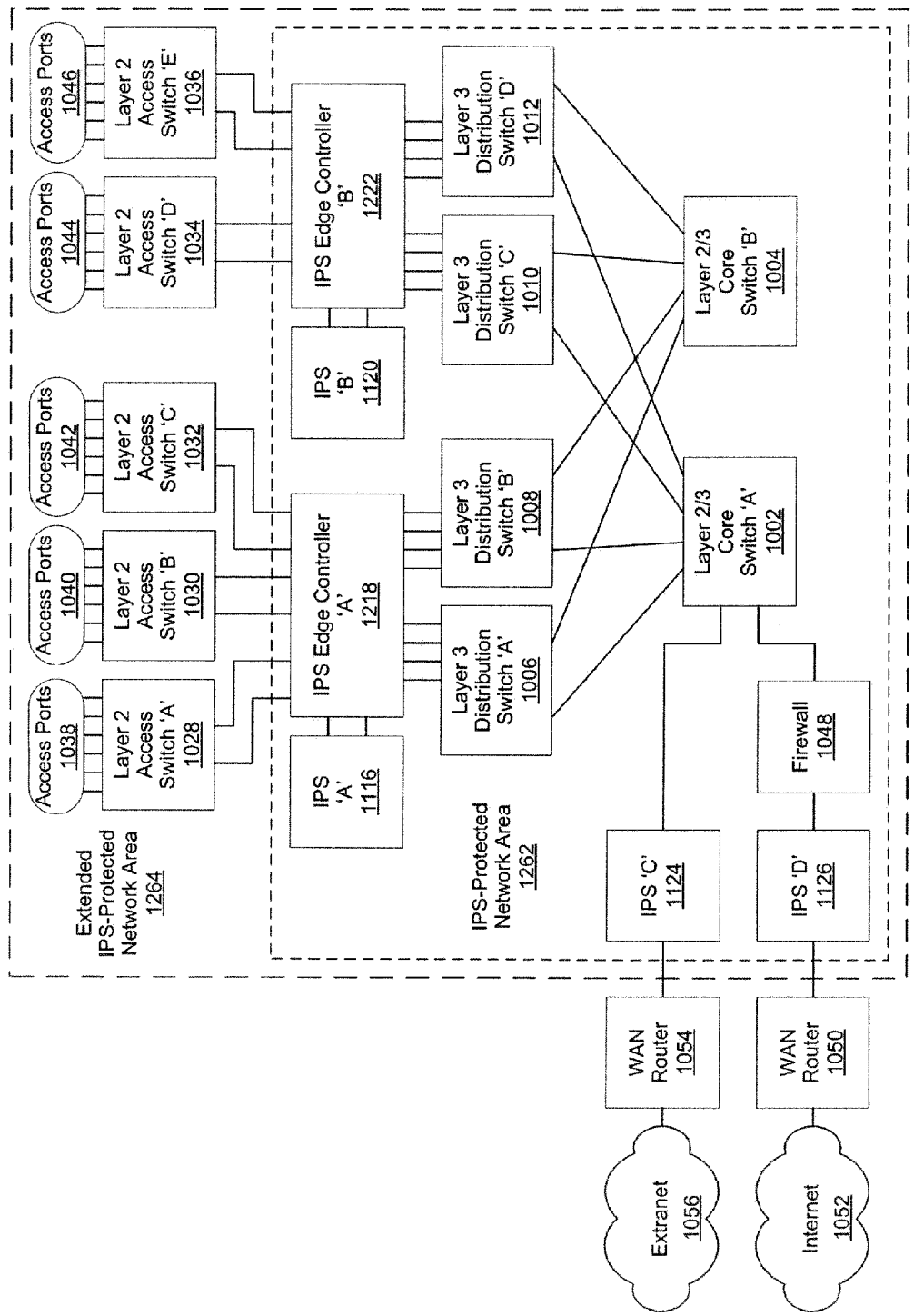
FIG. 12 is a generalized illustration of an embodiment of the present invention as implemented in a network environment comprising redundantly connected Layer 2/3 switches to provide a BITP-based IPS.

FIG. 12 is a generalized illustration of an embodiment of the invention as implemented in a network environment comprising redundantly connected Layer 2/3 switches to provide a "Bump In Traffic Path" (BITP) Intrusion Prevention System (IPS). In this embodiment of the invention, Layer 3 distribution switches 'A' 1006, 'B' 1008, 'C' 1010, 'D' 1012 are redundantly connected to Layer 2/3 core switches 'A' 1002 and 'B' 1004. IPS 'A' 1116 is connected to IPS Edge Controller 'A' 1218, which is connected to Layer 3 distribution switches 'A' 1006, 'B' 1008, and to Layer 2 access switches 'A' 1028, 'B' 1030, 'C' 1032, respectively providing access ports 1038, 1040, 1042. IPS 'B' 1120 is connected to IPS Edge Controller 'B' 1222, which is connected to Layer 3 distribution switches 'C' 1010, 'D' 1012, and to Layer 2 access switches 'D' 1024, 'E' 1036 respectively providing access ports 1044, 1046.

Protected connectivity to Extranet 1056 is provided through WAN router 1054, which precedes and is connected to IPS 'C' 1124, which in turn precedes and is connected to Layer 2/3 core switch 'A' 1002. Protected connectivity to the Internet 1052 is similarly provided WAN router 1050, which precedes and is connected to through IPS 'D' 1126, which precedes and is connected to firewall 1048, which likewise precedes and is connected to Layer 2/3 core switch 'A' 1002. In this illustration IPS-protected network area 1262 includes Layer 3 distribution switches 'A' 1006, 'B' 1008, 'C' 1010, 'D' 1012.

Furthermore, in an embodiment of the invention, an extended IPS-protected network area 1264 that includes Layer 2 access switches 'A' 1028, 'B' 1030, 'C' 1032, 'D' 1034, 'E' 1036, and their respective access ports 1038, 1040, 1042, 1044, 1046, is implemented through the use of private VLANs to place each user in an isolated Layer 2 area as described in greater detail herein. As will be apparent to those of skill in the art, this approach prevents direct peer-to-peer traffic through a Layer 2 access switch. Instead, all traffic is conveyed to a Layer 3 distribution switch, which requires all traffic to first pass through an IPS Edge Controller and an associated IPS before reaching its intended destination, thereby providing an extended IPS-protected network area 1264.

Figure 13:
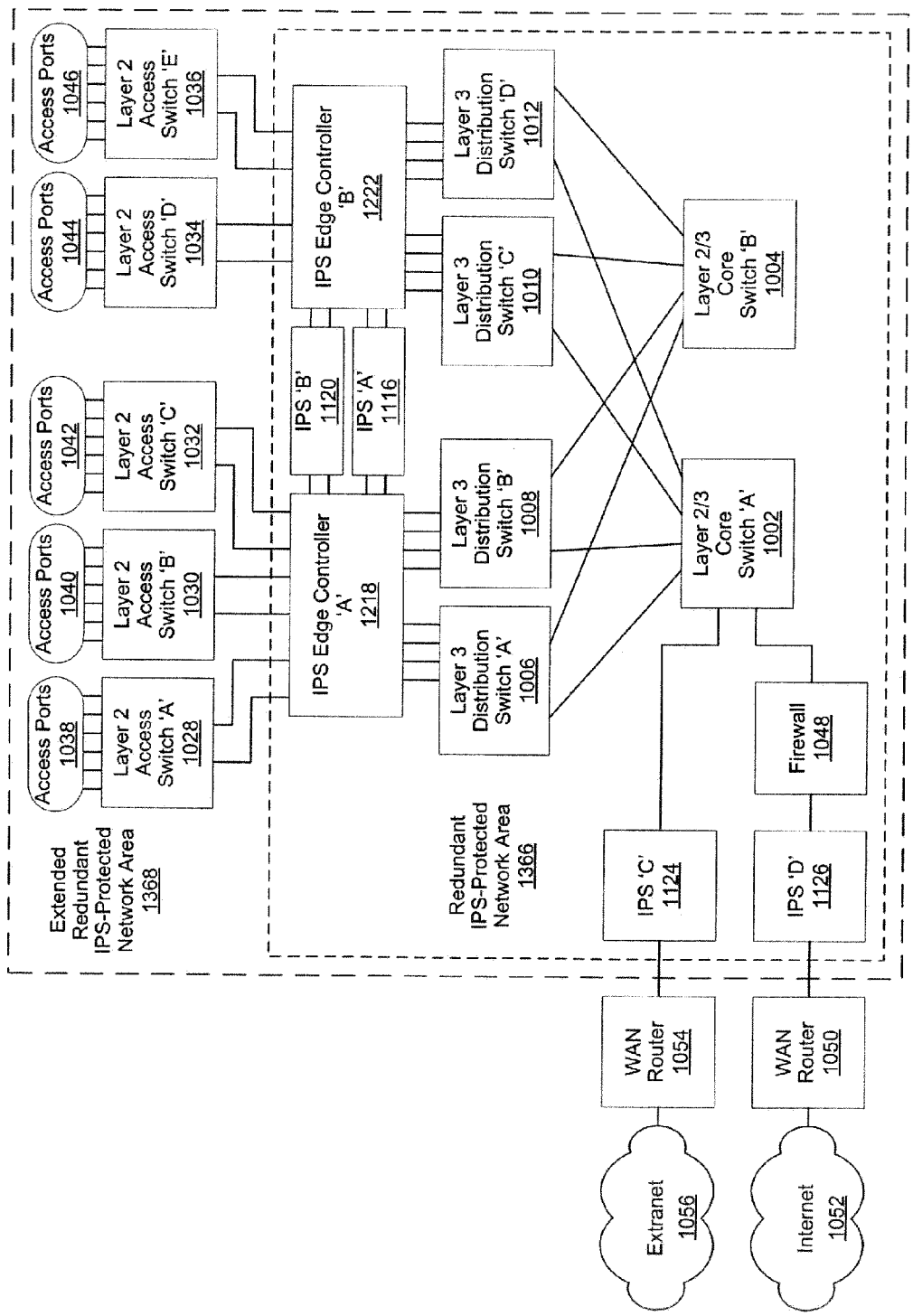
FIG. 13 is a generalized illustration of an embodiment of the invention as implemented in a network environment comprising redundantly connected Layer 2/3 switches to provide a redundant BITP-based IPS.

FIG. 13 is a generalized illustration of an embodiment of the invention as implemented in a network environment comprising redundantly connected Layer 2/3 switches to provide a redundant "Bump In Traffic Path" (BITP) Intrusion Prevention System (IPS). In this embodiment of the invention, Layer 3 distribution switches 'A' 1006, 'B' 1008, 'C' 1010, 'D' 1012 are redundantly connected to Layer 2/3 core switches 'A' 1002 and 'B' 1004. IPS 'A' 1116 and IPS 'B' 1120 are redundantly connected to IPS Edge Controller 'A' 1218 and IPS Edge Controller 'B' 1222. IPS Edge Controller 'A' 1218 is connected to Layer 3 distribution switches 'A' 1006, 'B' 1008, and to Layer 2 access switches 'A' 1028, 'B' 1030, 'C' 1032, respectively providing access ports 1038, 1040, 1042. IPS Edge Controller 'B' 1222 is connected to Layer 3 distribution switches 'C' 1010, 'D' 1012, and to Layer 2 access switches 'D' 1034, 'E' 1036 respectively providing access ports 1044, 1046.

Protected connectivity to Extranet 1056 is provided through WAN router 1054, which precedes and is connected to IPS 'C' 1124, which in turn precedes and is connected to Layer 2/3 core switch 'A' 1002. Protected connectivity to the Internet 1052 is similarly provided WAN router 1050, which precedes and is connected to through IPS 'D' 1126, which precedes and is connected to firewall 1048, which likewise precedes and is connected to Layer 2/3 core switch 'A' 1002. In this illustration redundant IPS-protected network area 1366 includes Layer 3 distribution switches 'A' 1006, 'B' 1008, 'C' 1010, 'D' 1012 and Layer 2/3 core switches 'A' 1002 and 'B' 1004.

Furthermore, in an embodiment of the invention, an extended redundant IPS-protected network area 1368 that includes Layer 2 access switches 'A' 1028, 'B' 1030, 'C' 1032, 'D' 1034, 'E' 1036, and their respective access ports 1038, 1040, 1042, 1044, 1046, is implemented through the use of private VLANs to place each user in an isolated Layer 2 area as described in greater detail herein. As will be apparent to those of skill in the art, this approach prevents direct peer-to-peer traffic through a Layer 2 access switch. Instead, all traffic is conveyed to a Layer 3 distribution switch, which requires all traffic to first pass through an IPS Edge Controller and an associated IPS before reaching its intended destination, thereby providing an extended redundant IPS-protected network area 1368.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. An apparatus for redirecting network traffic, comprising:
a plurality of first ports;
a plurality of second ports, wherein each of the plurality of second ports corresponds with a respective one of the plurality of first ports;
one or more IPS ports (I-ports) to connect to a network traffic processing device, wherein the plurality of first ports and the plurality of second ports are connected to the one or more I-ports, and wherein packets received through each of the plurality of first ports are to be communicated out of the apparatus through at least one of the one or more I-ports, received back into the apparatus through at least one of the one or more I-ports, and communicated out of the apparatus through the plurality of second ports; and
wherein the apparatus is to add a virtual local area network (VLAN) tag to each packet received through the plurality of first ports, wherein the VLAN tag indicates which second port of the plurality of second ports the packet is to be outputted, and wherein the apparatus is to examine the added VLAN tag of each of the packets received back into the one or more I-ports to determine which of the plurality of second ports the packets are to be outputted.

2. A system for redirecting network traffic, comprising:
a first edge controller comprising,
a plurality of first ports,
a plurality of second ports, wherein each of the plurality of second ports corresponds with a respective one of the plurality of first ports; and
one or more IPS ports (I-ports), wherein the plurality of first ports and the plurality of second ports are connected to the one or more I-ports; and
a second edge controller comprising,
a plurality of first ports,
a plurality of second ports, wherein each of the plurality of second ports corresponds with a respective one of the plurality of first ports; and
one or more IPS ports (I-ports), wherein the plurality of first ports and the plurality of second ports are connected to the one or more I-ports; and
wherein the one or more I-ports of the first edge controller are connected to at least one of the first plurality of first ports of the second edge controller, wherein the one or more I-ports of the second of controller are to connect to a network traffic processing device, wherein at least one of the plurality of second ports of the second edge controller is connected to the one or more I-ports of the first edge controller; and
wherein the first edge controller is to add a virtual local area network (VLAN) tag to each packet received through the plurality of first ports, wherein the VLAN tag indicates which second port of the first edge controller the packet is to be outputted following receipt of the packet from the second edge controller, and wherein the first edge controller is to examine the added VLAN tag of the packet following receipt of the packet back from the second edge controller to determine which of the plurality of second ports of the first edge controller the packets are to be outputted.

3. A system for processing network traffic, comprising:
an edge controller; and
a network security device directly coupled via cables to the edge controller;
the edge controller comprising:
a first set of end-point ports (E-ports);
a second set of E-ports, wherein each of the E-ports in the second set of S-ports corresponds to a respective one on the first set of E-ports; and
at least one IPS port (I-port), wherein the first set of E-ports and the second set of E-ports are connected to the at least one I-port, and wherein edge controller is communicatively connected to the network traffic processing device through at least one of the I-ports, wherein the edge controller is to receive network traffic into the first set of E-ports, to direct the network traffic to the at least one I-port, wherein the at least one I-port is to communicate the network traffic to the network traffic processing device, to receive the network traffic back from the network traffic processing device, and to send said network traffic to the second set of E-ports, wherein the second set of E-ports are to send the network traffic out of the edge controller; and
wherein the edge controller is to add a virtual area network (VLAN) tag to each packet received through the first set of E-ports, wherein the VLAN tag indicates which second port of the plurality of second ports the packet is to be outputted, and wherein the edge controller is to examine the added VLAN tag of each of the packets received back into the at least one I-port to determine which of the plurality of second ports the packets are to be outputted.

4. The apparatus of claim 3, wherein said edge controller is operable to provide multiplexing functionality to enhance the throughput of said network traffic.

5. The system of claim 3, wherein said at least one I-port comprises a plurality of I-ports communicatively coupled to said plurality of security devices.

6. The system of claim 5, wherein said first and second sets of E-ports are communicatively coupled to a communication channel having a first data throughput rate and wherein said at least one I-port is communicatively coupled to said security device via communication channels having a second data throughput rate that is higher than said first data throughput rate.

7. The apparatus according to claim 1, wherein the one or more I-ports comprise an outbound I-port and an inbound I-port, wherein the plurality of first ports are communicatively connected to the outbound I-port and the plurality of second ports are communicatively connected to the inbound I-port, wherein the outbound I-port is to output network traffic to the network traffic processing device and the inbound I-port is to receive network traffic from the network traffic processing device.

8. The apparatus according to claim 1, wherein the one or more I-ports comprise a single I-port, wherein the plurality of first ports and the plurality of second ports are communicatively connected to the single I-port, and wherein the single I-port is to output network traffic to and to receive network traffic back from the network traffic processing device through a single, bi-directional link.

9. The system according to claim 2, wherein the second edge controller is to add another virtual local area network (VLAN) tag to each packet as the packets are received through the plurality of first ports of the second edge controller, wherein the another VLAN tags indicate which of the plurality of second ports of the second edge controller corresponds to which of the plurality of first ports of the second edge controller and thereby indicate which of the plurality of second ports of the second edge controller that the packets are to be outputted from the second edge controller based upon which of the plurality of first ports the packets were received.

10. The system according to claim 2, wherein the one or more I-ports of the second edge controller are to direct network traffic received back from the network traffic processing device to the plurality of second ports of the second edge controller corresponding to the plurality of first ports from which the network traffic was received from the first edge controller.

11. The apparatus according to claim 7, wherein the one or more I-ports comprise pairs of outbound I-ports and inbound I-ports, wherein each pair of outbound I-ports and inbound I-ports is to be communicatively connected to a different network traffic processing device.

12. The apparatus according to claim 11, wherein the apparatus is to balance load across a plurality of the different network traffic processing devices.

\* \* \* \* \*

UNITED STATES PATENT AND TRADEMARK OFFICE
CERTIFICATE OF CORRECTION

| | |
|---|---|
| PATENT NO. | : 8,199,754 B2 |
| APPLICATION NO. | : 11/443490 |
| DATED | : June 12, 2012 |
| INVENTOR(S) | : Brian C. Smith et al. |

Page 1 of 1

It is certified that error appears in the above-identified patent and that said Letters Patent is hereby corrected as shown below:

In the Claims:

In column 16, line 7, in Claim 2, delete "of" and insert -- edge --, therefor.

In column 16, line 30, in Claim 3, delete "S-ports" and insert -- E-ports --, therefor.

In column 16, line 55, in Claim 4, delete "apparatus" and insert -- system --, therefor.

Signed and Sealed this
Seventh Day of May, 2013

Teresa Stanek Rea
*Acting Director of the United States Patent and Trademark Office*